United States Patent
Wortel et al.

(10) Patent No.: US 7,043,222 B2
(45) Date of Patent: May 9, 2006

(54) FSK MODULATOR USING IQ UP-MIXERS AND SINEWAVE CODED DACS

(75) Inventors: Klaas Wortel, Phoenix, AZ (US); Luis J. Briones, Chandler, AZ (US); Troy L. Stockstad, Chandler, AZ (US)

(73) Assignee: Standard Microsystems Corporation, Hauppauge, NY (US)

( * ) Notice: Subject to any disclaimer, the term of this patent is extended or adjusted under 35 U.S.C. 154(b) by 421 days.

(21) Appl. No.: 10/653,322

(22) Filed: Sep. 2, 2003

(65) Prior Publication Data

US 2005/0048931 A1    Mar. 3, 2005

(51) Int. Cl.
*H04B 1/10* (2006.01)

(52) U.S. Cl. ............... 455/304; 455/307; 375/308; 341/96

(58) Field of Classification Search ........... 455/303, 455/307, 304; 375/295, 302, 303, 304, 308; 341/94, 96, 97

See application file for complete search history.

(56) References Cited

U.S. PATENT DOCUMENTS

| | | | |
|---|---|---|---|
| 5,329,258 A | 7/1994 | Matsuura | |
| 5,832,027 A | 11/1998 | Ishigaki | |
| 5,835,539 A | 11/1998 | Yamakado | |
| 6,172,632 B1 | 1/2001 | Carter, IV | |
| 6,265,948 B1 | 7/2001 | Stevenson | |
| 6,288,618 B1 | 9/2001 | Stevenson et al. | |
| 6,674,812 B1 | 1/2004 | Stevenson | |
| 2004/0106380 A1* | 6/2004 | Vassiliou et al. | 455/73 |
| 2005/0159180 A1* | 7/2005 | Cheng et al. | 455/552.1 |
| 2005/0191974 A1* | 9/2005 | Pan | 455/109 |

OTHER PUBLICATIONS

Sato, H.; Kashiwagi, K.; Niwano, K.; Iga, T.; Ikeda, T.; Mashiko, K.; Sumi, T.; Tsuchihashi, K.; "A 1.9-GHz single chip IF transceiver for digital cordless phones," IEEE Journal of Solid-State Circuits, vol. 31, No. 12, Dec. 1996, pp. 1974-1980.

(Continued)

*Primary Examiner*—Nguyen T. Vo
*Assistant Examiner*—Nhan T. Le
(74) *Attorney, Agent, or Firm*—Meyertons Hood Kivlin Kowert & Goetzel, P.C.; Jeffrey C. Hood

(57) ABSTRACT

A radio transmitter system designed using an FSK modulator with IQ up-mixers and sinewave coded digital-to-analog converters (DACs). The radio transmitter system may include a frequency shift keying (FSK) coding logic circuit coupled to the inputs of an IQ modulation and image reject up-mixer through a respective DAC and a respective low pass filter (LPF) for each the I and the Q channels. The FSK modulation scheme may employ sine and cosine signals for the I and Q channels, respectively, where the sine and cosine waves are directly coded into the DACs. The coded levels required by the DACs may be generated using current sources and may be Gray-coded. The output of the IQ modulation and image reject up-mixer may be connected to a power amplifier, which may be used to transmit the modulated RF signal via a loop antenna.

20 Claims, 6 Drawing Sheets

OTHER PUBLICATIONS

Melly, T.; Porrel, A.-S.; Enz, C.C.; Vittoz, E.A.; "An ultralow-power UHF transceiver integrated in a standard digital CMOS process: transmitter," IEEE Journal of Solid-State Circuits, vol. 36, No. 3, Mar. 2001, pp. 467-472.

Stetzler, T.D.; Post, I.G.; Havens, J.II.; koyama, M.; "A 2.7-4.5 V single chip GSM transceiver RF integrated circuit," IEEE Journal of Solid-State Circuits, vol. 30, No. 12, Dec. 1995, pp. 1421-1429.

Cosentino, S.; Filoramo, P.; Granata, A.; Marletta, M.; Martino, G.; Pelleriti, R.; Torrisi, F.; Paparo, M.; Cosentino, ; Vita, P.; Palmisano, G.; "An integrated RF transceiver for DECT application," IEEE Journal of Solid-State Circuits, vol. 37, No. 3, Mar. 2002, pp. 443-449.

Henderson, Bert C., and James A. Cook, "Image-Reject and Single-Sideband Mixers," http://www.wj.com/pdf/technotes/ImageRej_n_SSB_mixers.pdf, Watkins-Johnson Company Tech-Notes, vol. 12, No. 3, May/Jun. 1985, pp. 1-13.

Merrimac, "Complex Modulators and Demodulators (I & Q Networks) 10 to 8,000 MHz General Information," http://www.merrimaeind.com/rfmw/02intro_modulators.pdf, Mar. 21, 1996, 4 pages.

* cited by examiner

FSK MODULATOR USING IQ UP-MIXERS AND SINEWAVE CODED DACS

BACKGROUND OF THE INVENTION

1. Field of the Invention

This invention relates generally to the field of wireless equipment design and, more particularly, to radio frequency (RF) modulator and demodulator design.

2. Description of the Related Art

The wireless world has become increasingly digitally oriented, leading Radio Frequency (RF) based design work to feature prominently in the scope of today's digital communications design. One effect of this development has been the prominence achieved by the development of modulators and demodulators, which provide a necessary RF interface for systems such as cordless phones, wireless networks, and wireless peripheral devices for computers, such as cordless mice, keyboards, etc. Considerations during design of such devices often include achieving low cost manufacturing, and assuring plug-and-play capabilities, very low power (for example, operating for a year or more on standard batteries), and high data rates for duty-cycle power savings.

There are many digital encoding standards that allow for the transmission of vast amounts of data over wireless RF interfaces in shorter periods of time. One well-known digital encoding technique based on frequency modulation (FM) is frequency shift keying (FSK), which in its simplest form provides two discrete RF frequencies that can be used as carriers to transmit two data states, which may correspond to the commonly used digital binary states of "1" and "0", respectively. FSK modulators are many times implemented through the use of an I and Q (IQ) network performing "quadrature modulation", where two out of phase (by 90°) carrier frequencies are modulated by the two separate digital binary states, respectively, as described above. In general, an IQ network produces two equal amplitude and quadrature phased output signals when provided with RF and Local Oscillator (LO) input signals.

Another widely used functional building block found in communications is the image reject mixer. A basic mixer is used to mix two frequencies and produce an output that consists of both the sum and difference frequencies. An image reject mixer performs the additional task of rejecting the frequency components that are produced as a result of the mixing process when one input to the mixer is an image of the desired signal. The IQ image reject up-mixer architecture incorporates the image reject mixer functionality into an IQ network operating as a quadrature modulation circuit. Commonly in such architecture, the IQ baseband channels are driven from a Digital to Analog Converter (DAC) generating the FSK modulating waveforms. Implementations of these IQ DACs are often complex due to a large number of bits required to reach adequate Signal to Noise ratios (SNRs). In addition to the complexity of the DACs, area consuming look-up tables are often used to drive these DACs. The tables typically provide the information used by the DACs to generate the modulated waveform.

Generally, most current implementations of IQ up-mixer architectures employ a vast array of standard DACs. Standard DAC implementations with low quantization noise typically require a substantial number of bits and are therefore complex, consume much more current, rely far more heavily on internal component matching, and generally consume lots more area and development time. As mentioned above, these implementations also require the use of look-up tables, which can be sizeable.

Alternative FSK modulators (direct modulators, in general) typically use a filtered digital bitstream signal to directly drive the associated Voltage Controlled Oscillator (VCO), hence omitting DACs altogether. A typical disadvantage of this approach is related to modulation accuracy, since VCOs typically have substantial tolerance on their control port. Direct VCO modulation also interferes with the PLL control loop, which places unwanted constraints on the digital bitstream, often requiring coding, for example Manchester coding. Alternatively, dual port systems are sometimes used, which in part solves the bitstream constraint issues, albeit at the expense of added complexity (added design time, current and area consumption.)

A standard direct modulation transmitter implemented in accordance with prior art is shown in FIG. 1. Data is input into a signal shaper 110, which is used to modulate a voltage controlled oscillator 120, which is part of a phase-locked loop (PLL) 106 that is connected to a power amplifier 104. Power amplifier 104 is used to transmit the modulated signal via a loop antenna 102. Signal shaper 110 may functionally be a filter, typically a low-pass filter (LPF) or a gaussian shape filter, operating to slow the edges of a Data input square wave signal in order to bring it within the operational constraints of VCO 120. PLL 106 may also include a crystal 126 providing a reference frequency to a phase frequency detector 122, which connects to an LPF 124 that is coupled to VCO 120 through summation node 128. Summation node 128 also couples the output of signal shaper 110 to VCO 120. The modulation accuracy of the transmitter shown in FIG. 1 is sensitive to the gain of VCO 120 ($K_c$), which may result in substantial bandwidth tolerance. Also, the bandwidth of the PLL 106 loop is constrained by the spectral content of the Data input. In other words, transfer of unlimited 1's or 0's is difficult to obtain, requiring data coding (for example Manchester coding, as mentioned above), in effect constraining the data throughput. In many aspects this design is very sensitive and highly constrained.

Therefore, there exists a need for a system and method for designing an accurate FSK modulator, which features very high accuracy in the baseband waveform, consumes low power, and can be implemented on a small die size with low complexity requiring a substantially short design time.

SUMMARY OF THE INVENTION

In one set of embodiments, the invention comprises a system and method that provides digital FSK modulation for a modulating bitstream using an IQ image reject up-mixer architecture with the waveforms coded directly into the digital-to-analog converters (DACs). In one embodiment the FSK modulation scheme uses sine and cosine signals in the I-channel and Q-channel, respectively, and the sine (cosine) waves are directly coded into the DACs. Quantization noise may thus be virtually eliminated, and no look-up tables may be required.

A radio transmitter system may be designed using an FSK modulator implemented in accordance with one set of embodiments of the present invention. The radio transmitter system may include an FSK coding logic circuit configured to receive a digital data input coupled to the inputs of an IQ modulation and image reject up mixer through a respective DAC and a respective LPF for each the I and the Q input paths. In one embodiment the FSK modulation scheme employs sine signals for the I-channel and cosine signals for the Q-channel, where the DACs provide sinusoid signals to the LPFs. Since only sine and cosine waves are used during FSK modulation, the sine (cosine) waves may be directly coded into the DACs. The output of the IQ modulation and image reject up-mixer may be connected to a power amplifier, which may be used to transmit the modulated signal via a loop antenna.

In one embodiment, current sources are used for generating respective output levels for each DAC. For encoding sine (cosine) waves, the number of current sources required for each DAC may equal one-half the oversampling rate. Gray-coding may be used for a digital representation and coding of the sine (cosine) waves. The radio transmitter system may also include a phase-locked loop (PLL) and voltage controlled oscillator (VCO) used for generating reference sine and cosine inputs into the respective mixers in the I-channel and Q-channel. Thus, the FSK coding logic circuit may provide a cosine wave signal to the Q-channel in accordance with the digital input, while the VCO may provide a sine wave signal to the mixer in the Q-channel. Similarly, the FSK coding logic circuit may provide a sine wave (sin) signal corresponding to a digital input value of '1' and a negative of the sine wave signal (–sin) corresponding to a digital value of '0' to the I-channel, while the VCO may provide a cosine wave signal to the mixer in the I-channel.

Thus, various embodiments of the invention may provide a means for FSK modulation using an IQ image reject up-mixer architecture with sinusoid signals used in mapping the digital input signal, and the sinusoid signals coded directly into the DACs of the FSK modulator.

BRIEF DESCRIPTION OF THE DRAWINGS

The foregoing, as well as other objects, features, and advantages of this invention may be more completely understood by reference to the following detailed description when read together with the accompanying drawings in which.

Figure 1:
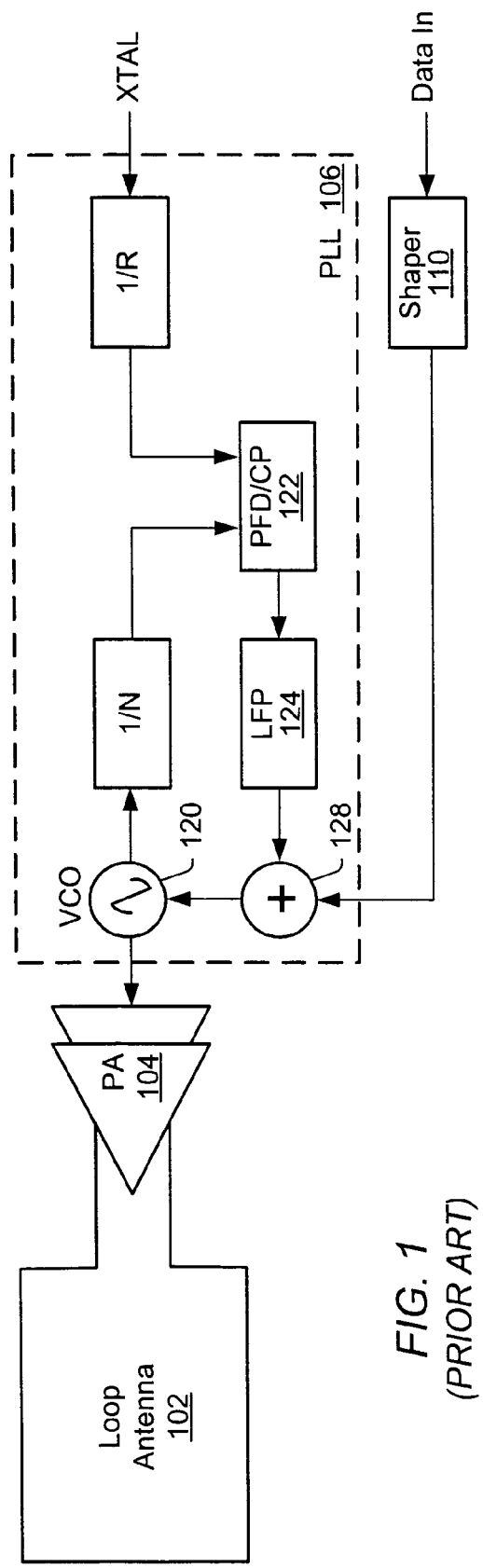
FIG. 1 illustrates a standard direct modulation transmitter, in accordance with prior art.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must)." The term "include", and derivations thereof, mean "including, but not limited to". The term "connected" means "directly or indirectly connected", and the term "coupled" means "directly or indirectly connected".

DETAILED DESCRIPTION OF THE PREFERRED EMBODIMENTS

Figure 2:
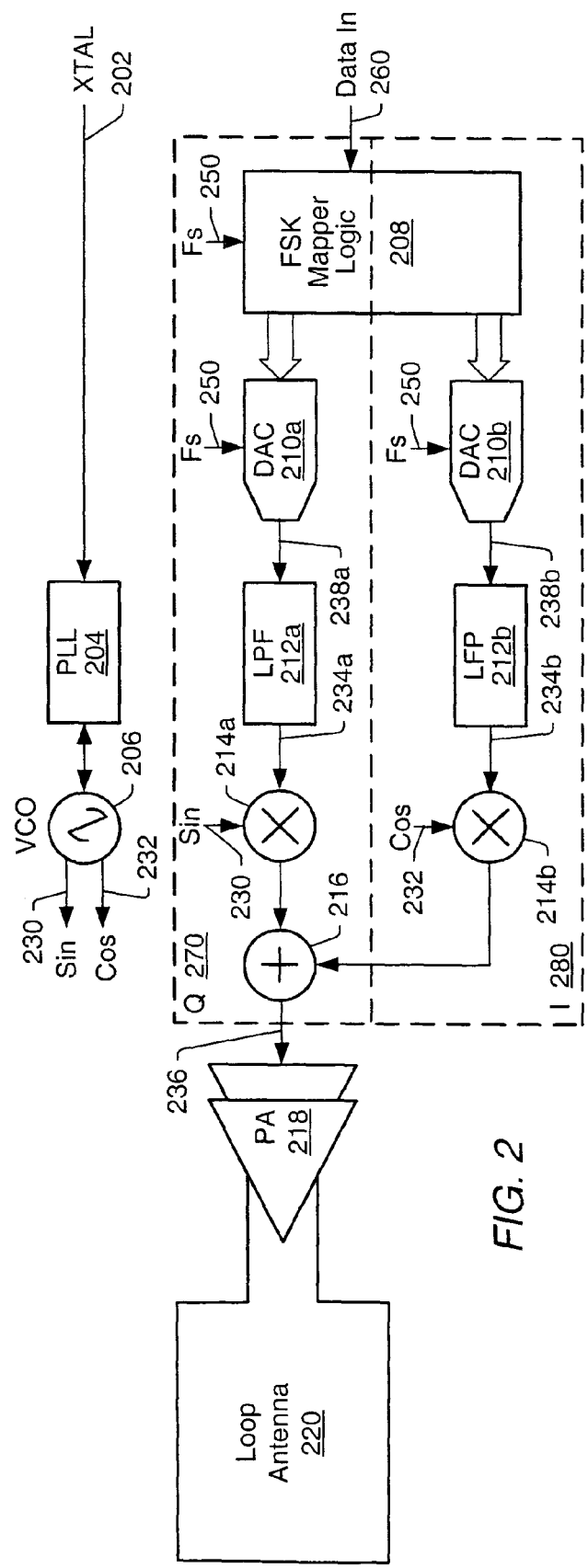
FIG. 2 illustrates one embodiment of an IQ modulation and image reject up mixer transmitter.

FIG. 2 illustrates one embodiment of an IQ modulation and image reject up mixer transmitter configured with sinewave coded DACs. In this embodiment, modulating input Data In 260 is fed into an FSK mapper logic circuit (FML) 208. FML 208 may map a binary input data stream provided through Data In 260 to sine waves and cosine waves. When modulating a binary value of '1', FML 208 may provide a cosine wave signal to Q-channel 270 and a sine wave signal to I-channel 280. Similarly, when modulating a binary value of '0', Q-channel 280 may again receive a cosine wave signal while I-channel 280 may receive a sinewave signal with amplitude opposite of the sine wave signal received by I-channel 280 when a binary value of '1' is being modulated. In one embodiment, Q-channel 270 and I-channel 280 each include a DAC (210a and 210b, respectively), a low-pass filter (LPF, 212a and 212b, respectively), and a mixer (214a and 214b, respectively). Outputs from mixers 214a and 214b may be summed together at summation node 216, and the resulting output 236 may be provided to a power amplifier 218, which may then use loop antenna 220 to transmit the modulated signal. To achieve an image reject up mixer configuration, sine wave input 230 may be provided to mixer 214 in Q-channel 270, and cosine wave input 232 may be provided to mixer 214b in I-channel 280. In one embodiment, sine wave 230 and cosine wave 232 are generated by VCO 206 through PLL 204, with a reference frequency provided by crystal (XTAL) 202. PLL 204 along with VCO 206 may be implemented independently of the other elements of the transmitter, thus allowing the consideration of PLL bandwidth to be independent from other elements of the transmitter circuit.

Referring again to FIG. 2, the input of mixer 214a arriving from LPF 212a may be expressed as $\cos(w_m t)$, and the input of mixer 214b arriving from LPF 212b may be expressed as $\sin(w_m t)$, referring to the modulated signals generated by FML 208. Similarly, the sine and cosine signals generated by VCO 206 may be expressed as $\sin(w_c t)$ for sine wave signal 230 and $\cos(w_c t)$ for cosine wave signal 232. Pursuant to the above, the output of mixer 241a may be expressed by the equation:

$$\tfrac{1}{2}\sin(w_c t - w_m t) + \tfrac{1}{2}\sin(w_c t + w_m t). \qquad (1)$$

Similarly, the output of mixer 214b may be expressed by the equation:

$$\tfrac{1}{2}\sin(w_m t - w_c t) + \tfrac{1}{2}\sin(w_m t + w_c t), \qquad (2)$$

which may be re-written as:

$$-\tfrac{1}{2}\sin(w_c t - w_m t) + \tfrac{1}{2}\sin(w_c t + w_m t). \qquad (3)$$

Thus, the output of summation node 216 may be written as $$\sin(w_c t + w_m t). \qquad (4)$$

Hence, the lower sideband may be suppressed, signaling a binary value of '1', and $-\sin(w_m t)$ may suppress the upper sideband, signaling a binary value of '0'.

In one embodiment, a 10 KHz signal frequency is considered, and the constraints for LPFs 212a and 212b are considered for a rejection greater than 40 dB. In this embodiment, an oversampling rate of sixteen would result in an effective sampling frequency Fs 250 of 160 Khz (10 KHz multiplied by sixteen) requiring no more than a first order LPF filter at 20 KHz, which may be implemented as, but not limited to, a Butterworth filter, with an effective rejection of 42 dB. An oversampling rate of sixteen together with the periodic nature of the sine and cosine waves lead to DACs 210a and 210b being required to generate no more than nine levels during conversion, and the use of sine and cosine waves for the mixer inputs in turn leads to the possibility of DACs 210a and 210b to be sine wave coded. In other words, since sinusoidal waves are expected as inputs by mixers 214a and 214b, the outputs of DACs 210a and 210b need not exhibit a linear behavior, and may be expected to generate sine waves.

The concept described above is illustrated in FIG. 3. Graph 302 illustrates a cosine waveform 320 and a sine waveform 310 that may be coded into DACs 210a and 210b, respectively. The nine voltage levels are shown on the vertical axis of graph 302 while the horizontal axis represents the angles corresponding to the sample point intervals. The horizontal axis is therefore segmented according to the selected oversampling rate of sixteen. That is, each interval between two angles shown represents a sampling interval. In other words, one wave may be defined by one complete period, or three hundred sixty degrees, each period divided into sixteen samples. Table 304 summarizes the values that appear in graph 302, where selection 306 contains the values for sine wave 310 and selection 308 contains the values for cosine wave 320. Due to the sine/cosine relationship, selections 306 and 308 contain the same values, 90 degrees out of phase with respect to each other.

Figure 3:
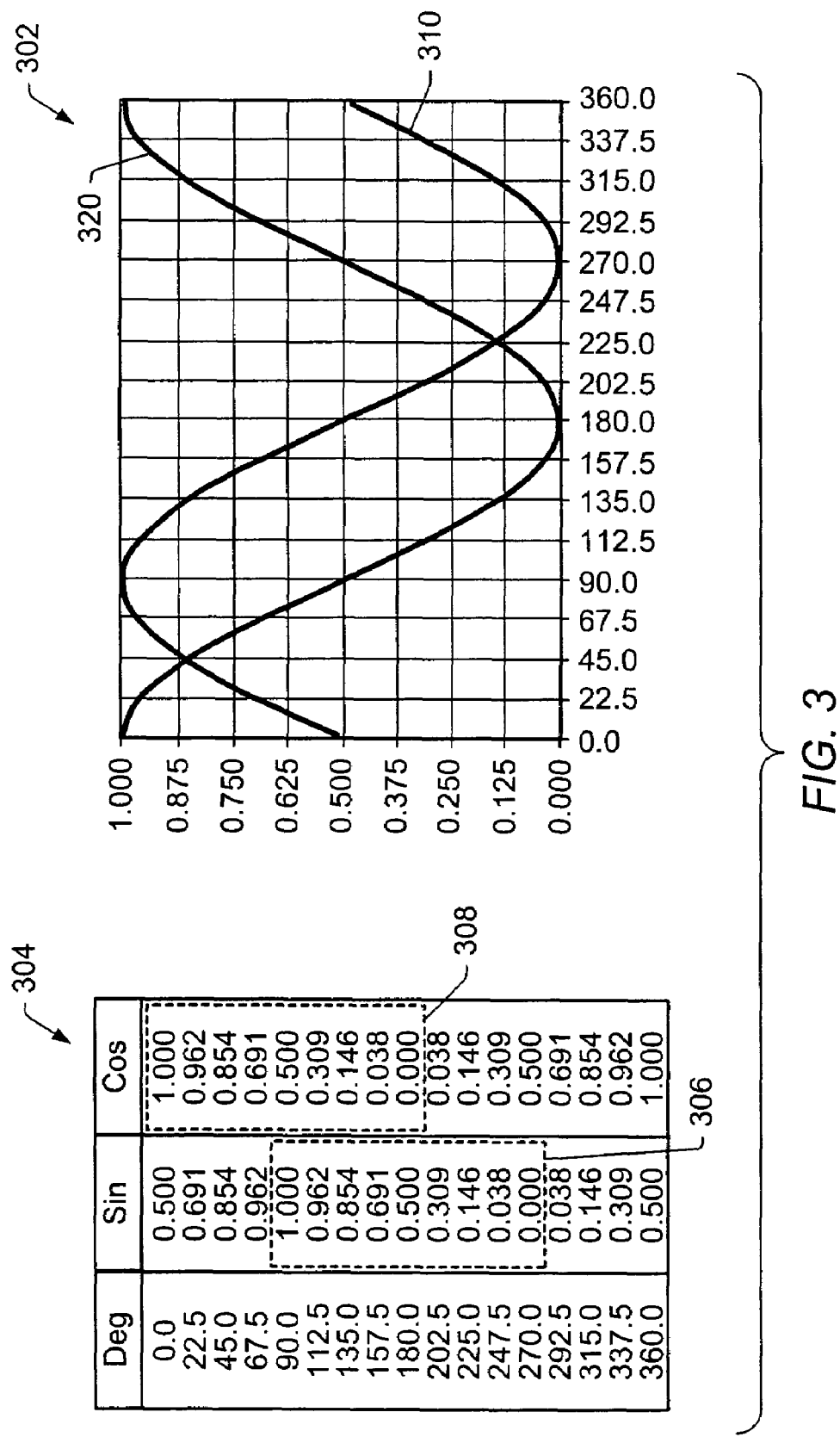
FIG. 3 illustrates a waveform diagram and value table for the waveforms encoded in the DACs at 16× oversampling, according to one embodiment of the present invention.
Figure 4:
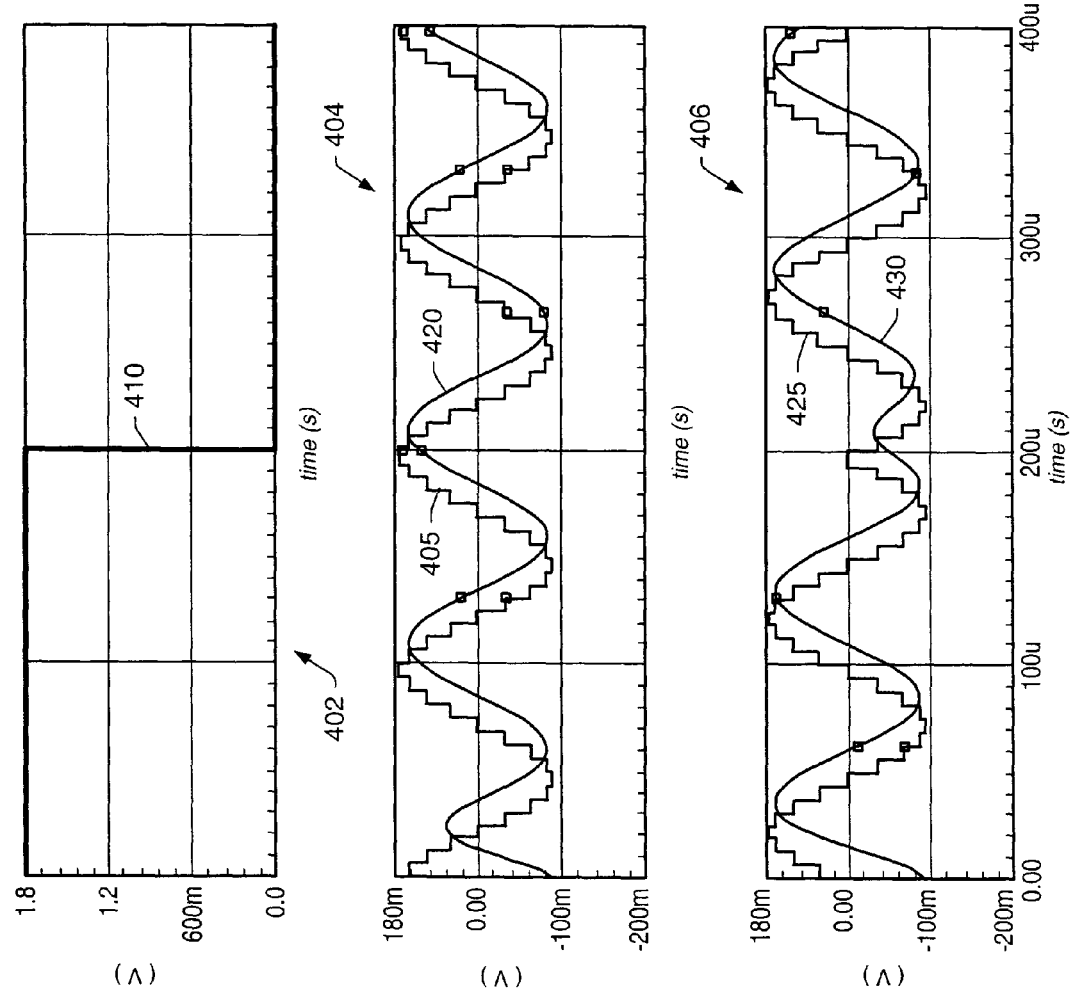
FIG. 4 illustrates waveform diagrams for Data In, and DAC and LPF outputs for the Q-channel and the I-channel, respectively, according to one embodiment of the present invention.

FIG. 4 illustrates the waveforms at DAC outputs 238a and 238b, and the corresponding LPF outputs 234a and 234b, respectively, when considering the analysis of the embodiment shown in FIG. 2 and FIG. 3. Graph 402 illustrates one possible Data In 260 input sequence 410 for a time frame of 400 μsec. Corresponding to input sequence 410 of graph 402 are DAC 210a output 415 and corresponding LPF 212a output 420 in graph 404, and DAC 210b output 425 and corresponding LPF 212b output 430 in graph 406, for the same 400 μsec time frame as shown in graph 402. As also shown in graph 402, input 410 represented by a square wave corresponds to a binary value '1' for the 0–200 μsec time frame, and to a binary value of '0' for the 200–400 μsec time frame. When input 410 occupies a level of '1', a corresponding modulated cosine component signal 420 is generated in the Q-channel, with a respective modulated sine component signal 430 generated in the I-channel. At the 200 μsec mark, when input 410 switches to a level of '0', the corresponding modulated cosine component signal 420 in the Q-channel remains unchanged, while the respective modulated sine component signal 430 appearing in the I-channel undergoes a phase shift of 90°. Referring to equations (1) and (3), this phase shift may be shown as negating the first term appearing in equation (1) to obtain the first term of equation (3), where the absolute value (or amplitude) of each term remains the same. The stepwise pattern of waveforms 415 425 corresponds to the nine discrete levels that may be coded into DACs 201a and 201b, with smooth waveforms 420 and 430 obtained after 415 and 425 have been operated on by LPFs 212a and 212b, respectively.

Figure 5:
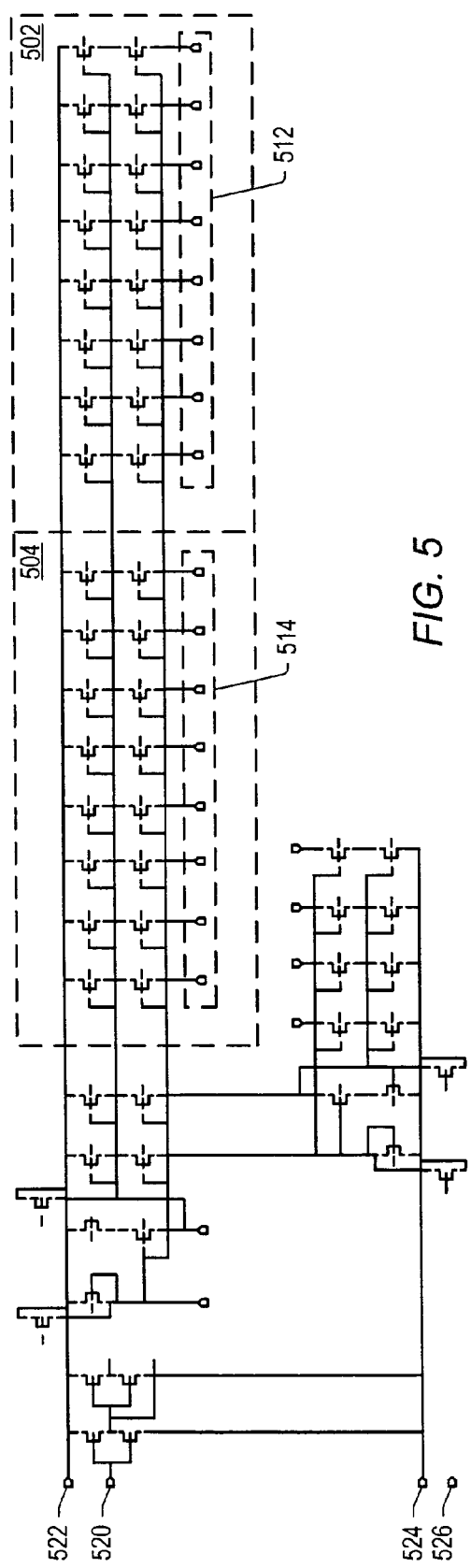
FIG. 5 illustrates current sources used for sinewave coding DACs, implemented using CMOS transistor devices according to one embodiment of the present invention.

In one set of embodiments, current sources may be used in coding the specific voltage levels for DACs 201a and 210b. FIG. 5 illustrates one embodiment of the current sources implemented using CMOS transistor devices. To generate nine discrete levels, which are shown in selections 306 and 308 in table 304 of FIG. 3, eight currents sources may be used for each DAC, respectively. Current sources 502 may be used for generating the required levels for DAC 210a by providing reference current outputs 512, and current sources 504 may be used for generating the required levels for DAC 210b by providing reference current outputs 514. In the embodiment shown, a wide swing current mirror configuration is used, and bottom wide swing current mirror is also implemented for DC bias. The levels may be coded using the Gray coding method. In other words, a first level may be generated by none of the current sources being enabled, a second level may be generated by enabling a first current source, a third level may be generated by enabling a first and second current source, and so forth until the final, and ninth, level may be generated by enabling all eight current sources. The different output currents provided by outputs 512 and 514 are matched in order to directly determine the DAC levels. The cascode diodes and input diodes are shorted by enable input 520 when in disable mode. Supply voltage $V_{dd}$ 522 and Gnd 524 may be connected as shown.

Figure 6:
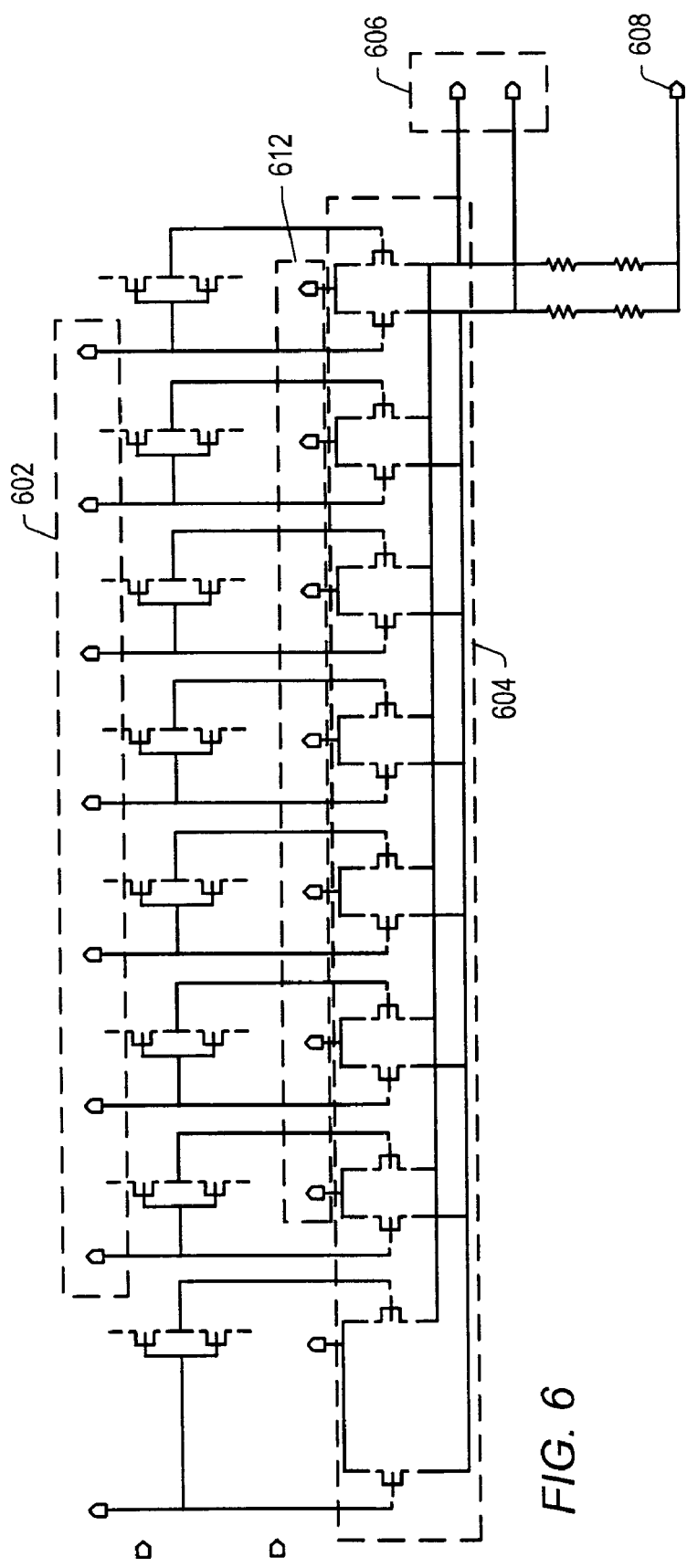
FIG. 6 illustrates one embodiment of a DAC used for implementing the DACs of FIG. 4 according to the present invention.

FIG. 6 illustrates one possible embodiment of DACs 210a and 210b. For the purposes of analysis, FIG. 6 shows a single DAC and DAC 210a will be referenced, but the same analysis may also apply to DAC 210b and to inputs and outputs of DAC 210b that correspond to respective inputs and outputs of DAC 210a. An input row 602 may include eight input terminals that may receive modulated digital input from FML 208 (as shown in FIG. 2). Each different 8-bit digital value may correspond to one of the voltage levels coded into current sources 502 of FIG. 5 (current sources 504 for DAC 210b), Gray-coded as previously described. Input row 612 may include eight input terminals that may receive reference current outputs 512 of FIG. 5 (reference current outputs 514 for DAC 210b). In the embodiment shown, the input terminals of input row 612 are coupling to differential pair devices. Since reference current signals 512 feed into a row of differential pair devices, a differential signal will appear at output terminals 606, from which a DC reference level 608 may be subtracted. The differential pairs may act as switches and thus not be sensitive to mismatch.

It should be noted that the values for oversampling, sampling frequency, and LPF considerations used above are for analysis purposes of preferred embodiments, and those values may be selected to be different from those presented. Similarly, while current sources were employed for generating the voltage levels for the DACs, other methods well known by those skilled in the art may equally be employed.

Thus, various embodiments of the systems and methods described above may facilitate design of an FSK modulator using IQ up-mixers with sinewave coded DACs. A transmitter constructed using the FSK modulator may include a PLL with an operating bandwidth independent from the rest of the modulator circuit. The transmitter is capable of transmitting infinite rows of 1's and 0's and does not require extra coding, such as Manchester coding, while achieving modulation accuracy consistent with cell phone quality requirements.

Although the embodiments above have been described in considerable detail, other versions are possible. Numerous variations and modifications will become apparent to those skilled in the art once the above disclosure is fully appreciated. It is intended that the following claims be interpreted to embrace all such variations and modifications. Note the section headings used herein are for organizational purposes only and are not meant to limit the description provided herein or the claims attached hereto.

We claim:

1. A radio transmitter comprising:
   a frequency shift keying (FSK) coding logic circuit;
   a first digital-to-analog converter (DAC) coupled to a first output of the coding logic circuit and a second DAC coupled to a second output of the coding logic circuit;
   a first filter coupled to the first DAC and a second filter coupled to the second DAC;
   a first mixer coupled to the first filter and a second mixer coupled to the second filter; and
   a summing device that combines an output of the first mixer and an output of the second mixer, providing a modulated output signal;
   wherein the coding logic circuit is operable to receive digital input data at a rate determined by an operating signal frequency;
   wherein the coding logic circuit is further operable to generate a digitally encoded first periodic signal based on the digital data input and to provide the digitally encoded first signal to the first DAC;
   wherein the coding logic circuit is further operable to generate a digitally encoded second periodic signal and to provide the digitally encoded second signal to the second DAC when amplitude of the digital input data corresponds to a first level;
   wherein the coding logic is further operable to generate a digitally encoded third periodic signal and to provide the digitally encoded third signal to the second DAC when amplitude of the digital input data corresponds to a second level;
   wherein the first mixer is operable to receive a fourth signal substantially shaped like the second signal, and to multiply the fourth signal with data signal received by the first mixer from the first filter;
   wherein the second mixer is operable to receive a fifth signal substantially shaped like the first signal, and to multiply the fifth signal with data signal received by the second mixer from the second filter;
   wherein the first signal is substantially equal to the second signal shifted by a determined phase angle; and
   wherein each DAC is configured to generate a non-linear output.

2. The radio transmitter of claim 1, further comprising:
   a phase-locked loop (PLL);
   a voltage-controlled oscillator (VCO) coupled to the PLL; and
   a crystal element coupled to the PLL;
   wherein the VCO is operable to generate the fourth signal and the fifth signal.

3. The radio transmitter of claim 1, wherein the third signal is substantially equal to the negative of the second signal.

4. The radio transmitter of claim 1, wherein the second signal is substantially shaped like a sine wave.

5. The radio transmitter of claim 1;
   wherein the digitally encoded first signal is Gray-coded;
   wherein the digitally encoded second signal is Gray-coded; and
   wherein the digitally encoded third signal is Gray-coded.

6. The radio transmitter of claim 5;
   wherein each output level produced by the first DAC is obtained from a first set of current sources, and each output level produced by the second DAC is obtained from a second set of current sources; and
   wherein the output levels for each respective DAC are Gray-coded.

7. The radio transmitter of claim 1, wherein each output level produced by the first DAC is obtained from a first set of current sources, and each output level produced by the second DAC is obtained from a second set of current sources.

8. The radio transmitter of claim 1, further comprising:
   a power amplifier configured to receive the modulated output signal; and
   a loop antenna coupled to the power amplifier;
   wherein the power amplifier is operable to amplify the modulated output signal; and
   wherein the loop antenna is operable to transmit the amplified modulated output signal.

9. A method for FSK modulation and data transmission, the method comprising:
   receiving a digital data input;
   generating a digitally encoded first periodic signal;
   generating a digitally encoded second periodic signal when amplitude of the digital data input corresponds to a first level;
   generating a digitally encoded third periodic signal when amplitude of the digital data input corresponds to a second level;
   converting the digitally encoded first periodic signal into the first periodic signal and filtering the first periodic signal;
   converting the digitally encoded second periodic signal into the second periodic signal and filtering the second periodic signal;
   converting the digitally encoded third periodic signal into the third periodic signal and filtering the third periodic signal;
   generating a fourth signal and multiplying the filtered first periodic signal with the fourth signal, resulting in a first mixed signal;
   generating a fifth signal and multiplying the filtered second periodic signal and the filtered third periodic signal with the fifth signal, resulting in a second mixed signal;
   summing the first mixed signal and the second mixed signal, resulting in a modulated output signal;
   wherein the fourth signal is substantially shaped like the second periodic signal, and the fifth signal is substantially shaped like the first periodic signal; and
   wherein the first periodic signal is substantially equal to the second periodic signal shifted by a determined phase angle.

10. The method of claim 9, wherein the third analog periodic signal is substantially equal to the negative of the second analog periodic signal.

11. The method of claim 9 further comprising amplifying the modulated output signal.

12. The method of claim 9;
    wherein said generating the fourth signal is performed by a VCO; and
    wherein said generating the fifth signal is performed by the VCO.

13. The method of claim 9;
    wherein said converting the digitally encoded first periodic signal is performed by a first DAC; and
    wherein said converting the digitally encoded second periodic signal and said converting the digitally encoded third periodic signal is performed by a second DAC.

14. The method of claim 13, wherein each output level produced by the first DAC is obtained from a first set of current sources, and each output level produced by the second DAC is obtained from a second set of current sources.

15. The method of claim 9;
wherein said generating a digitally encoded first periodic signal comprises generating a Gray-coded first periodic signal;
wherein said generating a digitally encoded second periodic signal comprises generating a Gray-coded second periodic signal; and
wherein said generating a digitally encoded third periodic signal comprises generating a Gray-coded third periodic signal.

16. The method of claim 15;
wherein said converting the digitally encoded first periodic signal is performed by a first DAC; and
wherein said converting the digitally encoded second periodic signal and said converting the digitally encoded third periodic signal is performed by a second DAC.

17. The method of claim 16;
wherein each output level produced by the first DAC is obtained from a first set of current sources, and each output level produced by the second DAC is obtained from a second set of current sources; and
wherein the output levels for each respective DAC are Gray-coded.

18. The method of claim 9, wherein the second signal is substantially shaped like a sine wave.

19. The method of claim 9, wherein said generating a fourth signal comprises generating a sine wave signal.

20. The method of claim 9, wherein said generating a fifth signal comprises generating a cosine wave signal.

* * * * *